United States Patent
Seddon

(10) Patent No.: US 10,334,322 B1
(45) Date of Patent: Jun. 25, 2019

(54) SYSTEM AND METHOD FOR MEDIA DELIVERY ON BROADCAST VIDEO NETWORKS

(71) Applicant: David Antony Seddon, Los Angeles, CA (US)

(72) Inventor: David Antony Seddon, Los Angeles, CA (US)

(*) Notice: Subject to any disclaimer, the term of this patent is extended or adjusted under 35 U.S.C. 154(b) by 0 days.

(21) Appl. No.: 15/884,166

(22) Filed: Jan. 30, 2018

(51) Int. Cl.
*H04N 7/173* (2011.01)
*H04N 21/6375* (2011.01)
*H04N 21/6405* (2011.01)
*H04L 29/06* (2006.01)
*H04L 12/801* (2013.01)

(52) U.S. Cl.
CPC ........ *H04N 21/6375* (2013.01); *H04L 47/34* (2013.01); *H04L 65/608* (2013.01); *H04N 21/6405* (2013.01)

(58) Field of Classification Search
USPC ........................................................ 725/116
See application file for complete search history.

(56) References Cited

U.S. PATENT DOCUMENTS

| | | | |
|---|---|---|---|
| 8,204,217 B2 | 6/2012 | Bjorkengren et al. | |
| 9,270,475 B2 | 2/2016 | Maxemchuk et al. | |
| 9,490,850 B1 * | 11/2016 | Paniconi | H03M 13/353 |
| 9,503,763 B2 * | 11/2016 | Van Zijst | H04L 47/125 |
| 2009/0064177 A1 * | 3/2009 | Bauer | G06F 9/544 |
| | | | 719/313 |

OTHER PUBLICATIONS

Patrick C.K. Wu; Soung Liew, Real-Time Multicast with Scalable Reliability, SPIE Digital Library, Oct. 7, 1998.
Daniel Bauser; Burkhard Stiller, Bernhard Plattner, An Error—Control Scheme for a Multicast Protocol Based on Round Trip Time Calculations, Semanticsscholar.org, Nov. 1998.

* cited by examiner

*Primary Examiner* — Nnenna N Ekpo
(74) *Attorney, Agent, or Firm* — Eandi Fitzpatrick LLP; William Fitzpatrick, Esq.

(57) ABSTRACT

A computer program implemented method for reliably transferring content sent between clients using a storage media and a computer processor is provided. The method describes receiving the content on a server array from a first node, storing the content on volatile memory on logical memory store, the logical memory store comprising at least two of the servers of the server array, creating a unique identification for the content, allowing retrieval of the content based on predetermined business logic, the unique identification or both, and resetting the volatile memory on the plurality of servers at a predetermined time after retrieval to permanently erase the content. A system for reliably transferring content sent between clients using a storage media and a computer processor is also provided.

13 Claims, 18 Drawing Sheets

TCP ha two (2) way positive acknowledgement, so these
messages can also be used for gathering RTT data.

Multicast is typically uni-directional (1) and does not acknowledge,
so RTT is unknown For this solution, the Receivers will send RTT probe messages.

Latency from Source A to Receivers B and C

Latency fromReceivers A, B to RP

R1 send latency probe to (*,g)

Probes arrive as S and R2+R3

S responds to (s,g)

Video Message

RTT Message (same IP/UDP pairs)

RTT Message (same IP/UDP pairs)

RTT Message (ICMP)

Appendix item- NTPv4 RFC Packet Header Reference

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|LI | VN  |Mode |    Stratum    |     Poll      |   Precision   |
+-+-+-+-+-+-+-+-+-+-+-+-+-+-+-+-+-+-+-+-+-+-+-+-+-+-+-+-+-+-+-+-+
|                         Root Delay                            |
+-+-+-+-+-+-+-+-+-+-+-+-+-+-+-+-+-+-+-+-+-+-+-+-+-+-+-+-+-+-+-+-+
|                       Root Dispersion                         |
+-+-+-+-+-+-+-+-+-+-+-+-+-+-+-+-+-+-+-+-+-+-+-+-+-+-+-+-+-+-+-+-+
|                        Reference ID                           |
+-+-+-+-+-+-+-+-+-+-+-+-+-+-+-+-+-+-+-+-+-+-+-+-+-+-+-+-+-+-+-+-+
|                                                               |
+                    Reference Timestamp (64)                   +
|                                                               |
+-+-+-+-+-+-+-+-+-+-+-+-+-+-+-+-+-+-+-+-+-+-+-+-+-+-+-+-+-+-+-+-+
|                                                               |
+                     Origin Timestamp (64)                     +
|                                                               |
+-+-+-+-+-+-+-+-+-+-+-+-+-+-+-+-+-+-+-+-+-+-+-+-+-+-+-+-+-+-+-+-+
|                                                               |
+                     Receive Timestamp (64)                    +
|                                                               |
+-+-+-+-+-+-+-+-+-+-+-+-+-+-+-+-+-+-+-+-+-+-+-+-+-+-+-+-+-+-+-+-+
|                                                               |
+                     Transmit Timestamp (64)                   +
|                                                               |
+-+-+-+-+-+-+-+-+-+-+-+-+-+-+-+-+-+-+-+-+-+-+-+-+-+-+-+-+-+-+-+-+
```

FIG. 10

SYSTEM AND METHOD FOR MEDIA DELIVERY ON BROADCAST VIDEO NETWORKS

FIELD OF THE INVENTION

The present invention relates to media delivery on Broadcast Video Networks (BVN). More particularly, the invention relates to a system and method to improve reliability of media delivery on BVNs that use internet protocol (IP) multicast.

BACKGROUND OF THE INVENTION

BVNs are networks which transport high quality video from locations like sports stadiums to be delivered to end users, typically via terrestrial/satellite broadcast or cable. All major sports events, including the Olympics, football, golf, horse racing, and the like, are carried over BVN networks.

BVNs are unique in terms of their high value, high bandwidth, multipoint, and reliability requirements because they transport high value streams, where dropping even a single video frame can cost millions of dollars. For example, a single black frame in the middle a Super Bowl Football advertisement will mean the advertiser does not pay the usual multi-million dollars for the advertisement slot. Additionally, fans (or users) will not pay the indulgent monthly subscriptions fees if the media (i.e., video and audio) regularly fails during game play. For these reasons, reliability is extremely important, and is the reason broadcasters spend millions of dollars on redundancy, failure protection solutions, and operators to react quickly to failures. However, The IP multicast networks regularly suffer link or node failures that results in packet loss, typically 50 ms, impacting video playback and costing broadcasters millions of dollars.

IP Multicast BVNs are networks which transport video, and are logically separated into two (2) sections: Contribution and Distribution. The contribution component is where high quality video is sourced from locations like sports stadium, of film studios, and delivered to a main studio or broadcast center. Then the video then undergoes various treatments, generally referred to as "production", where the video is edited, mixed, has advertisements inserted, and other modifications. The video within contribution side is typically as high as quality as possible and reliability is very important, as an impact here will affect all consumers. Most the production phase, the video then needs to be distributed to the consumers of the video. Typically, the video is typically significantly compressed to a much lower quality to allow it to be transmitted over the lower bandwidth delivery services.

IP Multicast Networks may utilize special purpose built wide area networks (WANs). The WANs that the IP multicast networks are run on also have dedicated guaranteed bandwidth so that bandwidth is guaranteed and not shared, unlike the Internet, such complex congestion control mechanisms are not necessary, although care is still required to avoid unnecessary retransmission and/or acknowledgement (ACK) and/or negative acknowledgement (NACK) implosion. WANs also have over-provisioned bandwidth to avoid the possibility of network congestion they have circuits that are over provisioned.

Further, the WANs have In-order delivery (fixed size packets). Typically, encoding devices generating the packet streams insert MPEG null packets resulting in fixed size packets of 1370 bytes. While this means that packet switch/route handling times are fixed, and packets arrive in order, it wastes bandwidth.

WANs also have video transport protocol simplicity (simple RTP encapsulation only), and consequently, the video encoders typically use very simplistic methods to transport the video over IP. They encapsulate the MPEG packets in Real-time Transport Protocol (RTP), but do not implement Real Time Control Protocol (RTCP), or Session Description Protocol (SDP). Furthermore, they even ignore parts of the RTP header, ignoring synchronization source (SSRC) identifier, and also ignore the contributing source (CSRC) identifiers. Streams are simply identified by the source-IP and multicast-group address, typically referred to a "S,G", and then in the case of multi-program-transport-streams (MPTS) the Packet Identifier (PID), which can lead to reliability issues.

WANs further comprise redundant circuits that are always deployed, which essentially means there is twice (2×) as much bandwidth as is strictly necessary, leading to higher cost since network devices are always duplicated.

Lastly, in WANs, high value streams are duplicated across the network to protect against any failure within the entire video chain. Protection is this case is typically automatic (sometimes manual) switching to the second stream if black is detected. In the automated case, the RTP headers are used to detect loss, and insert from the secondary stream. This is unduly complicated and burdensome.

IP multicast networks over these WANs are carefully designed to minimize bandwidth consumption, such that the shortest distribution tree is built from the source to all the receivers. At a high level, the network routers distribute network topology information with one another, select the best path, and then maintain regular heartbeat communication with each other via hello/reply messages. If/when the hello/reply messages detect a failure, a new best path needs to be selected and then used, which takes time. While there has been a large amount of effort to improve the failure detection time, reduce the time taken to switch to the next best path, in all cases there is a brief moment of packet loss.

Broadcasters have attempted to work around these issues by deploying high reliability devices, minimized timers, and Forward Error Correction (FEC) systems such as SDH/SONET Automatic Protection Switching (APS) Rapid Spanning Tree Protocol (RSTP), SDH/SONET and the like, but these are limited to between 50 ms and 2000 ms. In these systems on BVN, packet loss may occur.

These devices and work-arounds do not speak to the heart of the problem of packet loss, and also, these past ad hoc approaches for remedying some of the issues mentioned above are platform-specific, expensive, time consuming, and most importantly, are ineffective in some circumstances.

Packet loss in typical shared/Internet networks, is relatively complex, where we can typically see intermittent losses and out of order packets. The packet loss on BVNs is by comparison is very simple, as all packets arrive in the correct order, except during a failure when none of the packets arrive, and then after recovery all the packets continue arriving in order. The failure causes all the packets in a continuous sequence of dropped packets until the network recovers. This means that unlike the reliable TCP protocol, which uses positive (sometime selective) acknowledgement, with relatively complex retransmission methods, within BVNs retransmission can be greatly simplified.

As an example, assuming a network with four nodes: If the network between node 1 and node 2 fails, then downstream nodes 2, 3, 4 all miss the same packets. If the network between node 2 and node 3 fails, then downstream nodes 3 and 4 all miss the same packets.

For example, An Error-Control Scheme for a Multicast Protocol Based on Round-Trip Time Calculations by Daniel Bauer et al describes a system and method in which lost packets are detected using sequence numbers. Each packet contains a sequence number. If a receiver detects a gap in received sequence numbers, it requests lost packets from the sender or possibly from other receivers by sending a retransmission request (RRQ). If the RRQ is multicast to the group, other receivers that experienced an identical packet loss will recognize it and suppress their RRQ. However, this approach lacks in the feature combining the parallel timing, using the standard RTP headers, negative NACK, and NACKing based on early detection of loss by looking at the timing of when packets should arrive.

Further, Real-Time Multicast with Scalable Reliability by Patrick C. K. Wu et al describes a protocol for real-time multicast application scaled MSR (Multicast with Scalable Reliability) in which a receiver detects a loss when a timer expires or the sequence numbers of two successive received packets are not continuous. However, system assumes losses of single packets, when practically speaking, multiple packets may be lost.

U.S. Pat. No. 9,270,475 to Maxemchuk et al. describes a system and method for the repair of IP multicast sessions using a repair server that polls multiple transmit servers to accumulate as many of the packets missing from the multicast session as possible. In this system, retransmitted packets in the bypass session are forwarded to circumvent at least some of the congested, multicast enabled routers in the long-haul portion, accomplished by transmitting the missing packets over a separate dial-up network or a private virtual network from the retransmit servers to the repair server. However, the repair server transmits via unicast, not multicast, and is thus inoperable in certain situations.

There is a cost associated with these protection devices and methods. Even if they cut times down, to 50 ms, or a twentieth (1/20th) of a second, it still means many dropped video packets, leading to the inability to successfully reassemble an MPEG transport stream, resulting a failure to decode video and ultimately black video frames. Even with advanced FEC algorithms, like RaptorQ for example, that even at data rates as low as 7 Mb/s, there is loss of hundreds of packets, such that repair is impossible. Over time, as video quality improves, and the data rates go up, the number of lost packets will obviously increase.

Accordingly, there is a need for a system and method for improving reliability of media delivery on BVNs that use internet protocol (IP) multicast, while being easily scalable and inexpensive and virtually error-free.

BRIEF DESCRIPTION OF THE DRAWINGS

The present invention is illustrated by way of example, and not by way of limitation, in the figures of the accompanying drawings and in which like reference numerals refer to similar elements and in which:

FIG. 10 illustrates packet header format, according to an embodiment of the present invention;

Figure 1:
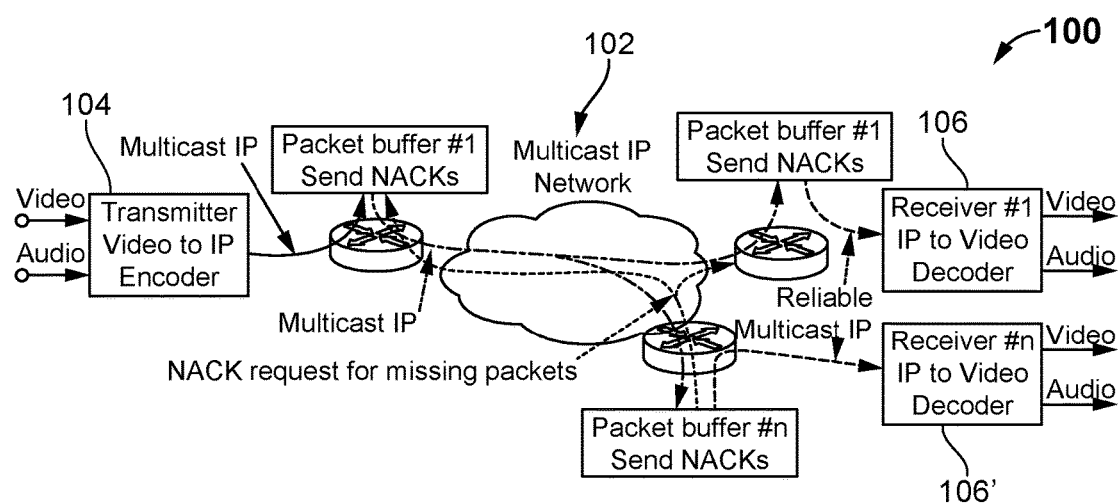
FIG. 1 is a high level block diagram of the system for improving reliability for IP Multicast Broadcast Video Networks (BVN), according to an embodiment of the present invention.

Unless otherwise indicated, illustrations in the figures are not necessarily drawn to scale.

SUMMARY OF THE INVENTION

To achieve the forgoing and other aspects and in accordance with the purpose of the invention, a method, system and computer program product for increasing user value is presented.

An objective of the invention is to improve reliability for a BVNs.

An objective of the invention is to provide a system and method for media delivery that is reliable and inexpensive to institute.

An objective of the invention is to protect IP multicast for RTP encapsulated video (SMPTE 2022), but if RTP is not used then byte off-set within the datastream it can be used.

The invention introduces video payload buffers with data indexed by the RTP sequence number, insertion of additional latency of the size of the buffer which is sized based on the expected path loss period, the latency from receiver to the source to request retransmission, and the path latency again from the source to the receiver. Detailed explanation of these latencies is explained in more detail below.

In embodiments of the present invention, downstream nodes receive media (e.g. the video), analyze the RTP sequence number, and request retransmission when there are out of linear sequence RTP packets. Retransmission requests convey a list (x,y,z), or a range (x-z), where multiple message formats are possible, including plain text, JSON, Apache Thrift, or Protobuf, as examples. The retransmission request is sent to a shared distribution tree, such that all the receivers of the video stream being protected can see or has notice of the negative acknowledgement (NACK) requests. This allows the receivers to suppress requests of packets that have already been requested by another receiver, and similarly the source can suppress sending more than one duplicate for a single network event.

This improves the reliability to aggregation points within the IP networks, such as xDSLAMs, Cable or xPON head-end routers as examples.

In embodiments of the present invention, the system and method for improving reliability for IP Multicast Broadcast Video Networks (BVN), is disclosed. In an embodiment, the BVN having real transport protocol (RTP) packets, the system comprises at least one data stream sender integral with the BVN. In one embodiment, the data stream sender comprises a processor and a memory for storing instructions. Said instructions, when executed by the processor causes the data stream receiver to detect a Network round-trip time based on one or more shared multicast probes, using either time information embedded within the RTP payload, or via an alternative user datagram protocol (UDP) packet with time information or via an internet control message protocol (ICMP) timestamp messages for controlling retransmission, where a unicast transmission control protocol (TCP) leverages the two way positively acknowledged communication to gather latency timing information, and suppress sending more than one duplicate for a single network event.

In one embodiment, a method for improving reliability for IP Multicast Broadcast Video Networks (BVN) is also disclosed. At step one, the method includes inserting additional latency of the size of the buffer based on the expected path loss period. The downstream nodes receive the video, analyze the RTP sequence number, and request retransmission when there are out of linear sequence RTP packets, automatic buffer size learning, or tuning, based on the network latency detection.

At a second step, the method includes requesting retransmission from a receiver to the source for the missing data referenced by either the RTP sequence number, or by byte-offset. The retransmission request is sent to a shared distribution tree, such that all the receivers of the video stream being protected can see the negative acknowledgement (NACK) requests. The method further comprises tracking inter-packet arrival times and allowing the receivers to suppress requests of packets that have already been requested by another receiver, while also allowing the source to suppress sending more than one duplicate, for a single network event. At a third step, the method includes detecting Network round-trip time based on shared multicast probes, using either time information embedded within RTP payload, or via an alternative UDP packet with time information, or via ICMP timestamp messages for controlling retransmission, where a unicast TCP leverages the two-way positively acknowledged communication to gather latency timing information.

Other features, advantages, and aspects of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed, but that all fit within the scope of the invention. Also, singular words should be read as plural and vice versa and masculine as feminine and vice versa where appropriate, and alternative embodiments do not necessarily imply that the two are mutually exclusive.

It is to be further understood that the present invention is not limited to the particular methodology, compounds, materials, manufacturing techniques, uses and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

Those skilled in the art will readily recognize, in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

While exemplary embodiments of the present invention will be described with reference to certain types of mobile applications, a skilled artisan will realize that embodiments of the invention are applicable to different types of networking and broadcasting systems and platforms.

As used herein, the term "media" shall mean audio and video content and their variants, together with packet transmission.

Referring to FIG. 1, a high level diagram of the system 100 and method for improving reliability for IP Multicast Broadcast Video Networks (BVN) 102, according to the present invention, is illustrated and provided. The BVN 102 comprises real transport protocol (RTP) packets, and the system 100 comprises at least one data stream receiver 106 integral with the BVN. In one embodiment, the data stream receiver 106 comprises a processor and a memory for storing instructions. Said instructions, when executed by the processor, causes the data stream receiver 106 to introduce a video payload buffer with the data which is indexed by the RTP packet sequence number to the BVN 102. The data stream receiver 106 is configured to send a negative acknowledgement (NACK) request for a missing packet of the RTP packets.

In one embodiment, the NACK comprises a plurality of packet sequence numbers in which each packet of the RTP packets comprises singleton packet sequence numbers, a range of singleton packet sequence numbers, or both. In one embodiment, the range comprises low and high sequence numbers. In one embodiment, the NACK request is a shared multicast *.g request for retransmission such that a plurality of the at least one data stream receivers 106 receive the NACK, allowing for suppression of NACKs for the RTP packets. In one embodiment, the data stream receiver 106 inserts additional latency of the size of the buffer based on expected path loss period, allowing suppression of duplicate NACK requests by other data stream receivers 106.

The present invention also discloses a system 100 for improving reliability for IP Multicast Broadcast Video Networks (BVN) 102. In an embodiment, the BVN 102 comprises real transport protocol (RTP) packets, and the system 100 comprises at least one data stream sender/transmitter/source 104 integral with the BVN 102. In one embodiment, the data stream sender 104 comprises a processor and a memory for storing instructions. Said instructions, when executed by the processor, causes the data stream sender 104 to detect a Network round-trip time based on one or more shared multicast probes, using either time information embedded within the RTP payload, or via an alternative user datagram protocol (UDP) packet with time information or via an internet control message protocol (ICMP) timestamp messages for controlling retransmission, where a unicast transmission control protocol (TCP) leverages the two way positively acknowledged communication to gather latency timing information, and suppress sending more than one duplicate for a single network event.

Figure 2:
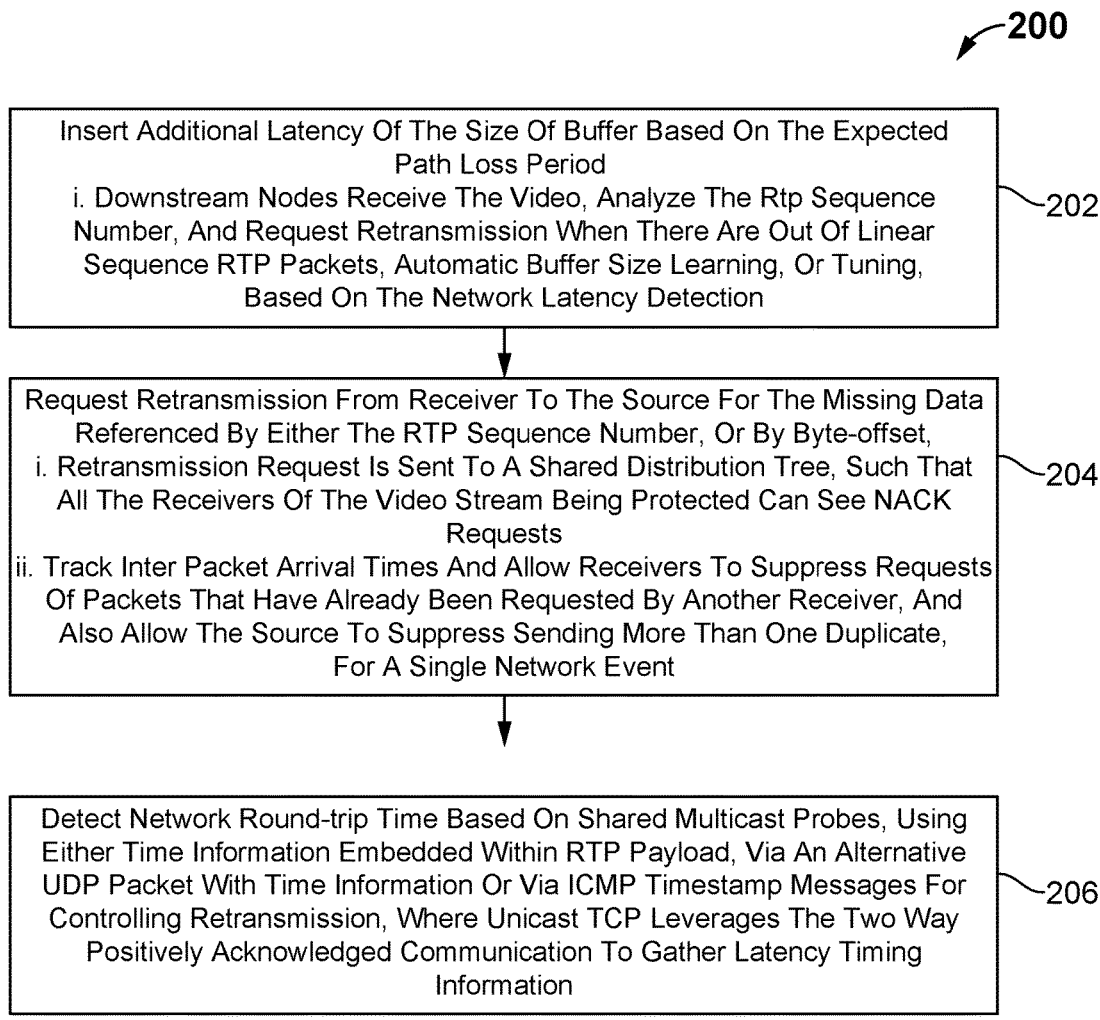
FIG. 2 is a flowchart showing a method for improving reliability for IP Multicast Broadcast Video Networks (BVN), according to an embodiment of the present invention

Referring to FIG. 2, a method 200 for improving reliability for IP Multicast Broadcast Video Networks (BVN) 102, with reference to system 100 of FIG. 1 is shown. At step 202, the method 200 includes inserting additional latency of the size of the buffer based on the expected path loss period. The downstream nodes receive the video, analyze the RTP sequence number, and request retransmission when there are out of linear sequence RTP packets, automatic buffer size learning, or tuning, based on the network latency detection.

At step 204, the method 200 includes requesting retransmission from receiver 106 to the source/transmitter/sender 104 for the missing data referenced by either the RTP sequence number, or by byte-offset. The retransmission request is sent to a shared distribution tree, such that all the receivers 106 of the video stream being protected can see the negative acknowledgement (NACK) requests. The method 200 further includes, tracking inter-packet arrival times and allowing the receivers 106 to suppress requests of packets that have already been requested by another receiver 106', and also allowing the source 104 to suppress sending more than one duplicate for a single network event. At step 206, the method 200 further comprises detecting Network round-trip time based on shared multicast probes, using either time information embedded within RTP payload, or via an alternative UDP packet with time information or via ICMP timestamp messages for controlling retransmission, where a unicast TCP leverages the two way positively acknowledged communication to gather latency timing information.

Further explanation to the above mentioned description with reference to FIG. 1-FIG. 2, the present invention broadly relates to a system 100 and method 200 for improving reliability for IP multicast Broadcast Video Networks (BVNs) 102. The IP multicast networks 102 regularly suffer link or node failures that results in packet loss, typically 50 ms, impacting video playback. The present invention discloses providing a video payload buffers with the data indexed by the RTP sequence number, inserting additional latency of the size of the buffer which is sized based on the expected path loss period, the latency from receiver 106 to the source 104 to request retransmission, and then improving path latency again from the source 104 to the receiver 106.

Downstream nodes receive the video, analyze the RTP sequence number, and request retransmission when there are out of linear sequence RTP packets. Retransmission requests simply convey a list (x,y,z), or a range (x-z), where multiple message formats are possible, including plain text, JSON, Apache Thrift, or Protobuf. Importantly, the retransmission request is sent to a shared distribution tree, such that all the receivers 106 of the video stream being protected can see the negative acknowledgement (NACK) requests. This allows the receivers 106 to suppress requests of packets that have already been requested by another receiver 106', and similarly the source 104 can suppress sending more than one duplicate, for a single network event.

Currently, transmission control protocol (TCP) is the prevailing protocol on the internet, where unicast 24 traffic flows communicate between two nodes. The protocols allow for in-order, reliable delivery by way of positive acknowledgement and retransmission of a byte stream. The TCP protocol has the desirable features for BVNs 102, with the exception that TCP is for unicast only, whereas multicast uses UDP. According to the present invention, the system 100 incorporates various components that allow multicast delivery to share many of the same functions as TCP.

The latency, or round-trip-time (RTT), between the nodes is very important to control retransmission, specifically where unicast TCP leverages the two-way positively acknowledged communication to gather latency timing information. Multicast on the other hand is typically unidirectional, so it is impossible to determine any network timing information. Therefore, the present invention introduces methods to probe the network latency. This latency or timing information is important to allow automatic buffer size allocation, which may be defined as adding additional delay into the system and Negative acknowledgement (NACK) flood suppression.

Figure 3A:
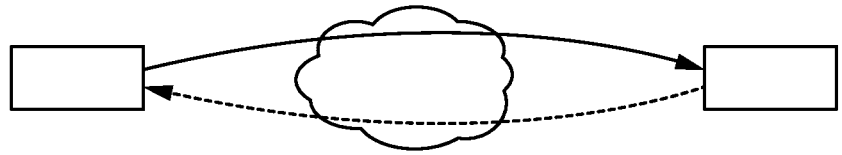
FIG. 3A shows acknowledgement of TCP over the shared multicast tree.
Figure 3B:
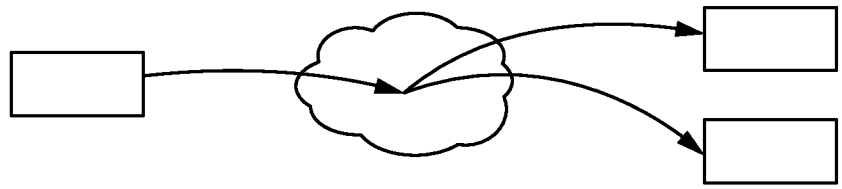
FIG. 3B illustrates a multicast being typically unidirectional.
Figure 3C:
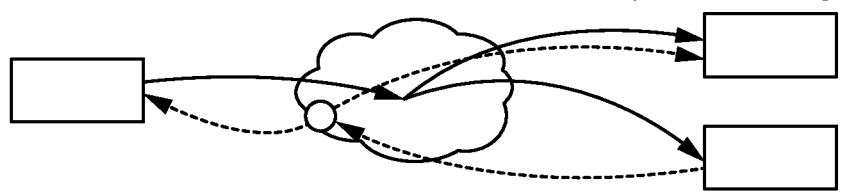
FIG. 3C shows system having RTT probes, with similarity to TCP, according to an embodiment of the present invention.

Referring to FIG. 3, the difference between unicast TCP and multicast, and finally shows usage of RTT probe messages over the same shared multicast tree according to the the present invention, is shown, as any retransmission request messages will be sent.

Reliable RTP video, according to the present invention relies on knowing or calculating the latency in both directions. A first direction, from the video source 104, via the (S,G) group address, to the video receivers 106, and a second direction, the reverse path from the video receivers 106, via the (*,G) group address, to the video source 104. In some embodiments, the present invention may use existing NTPv4, including packet payload format and variables, while making important modifications to suit the multipoint latency timing requirements to improve the media stream.

Figure 4A:
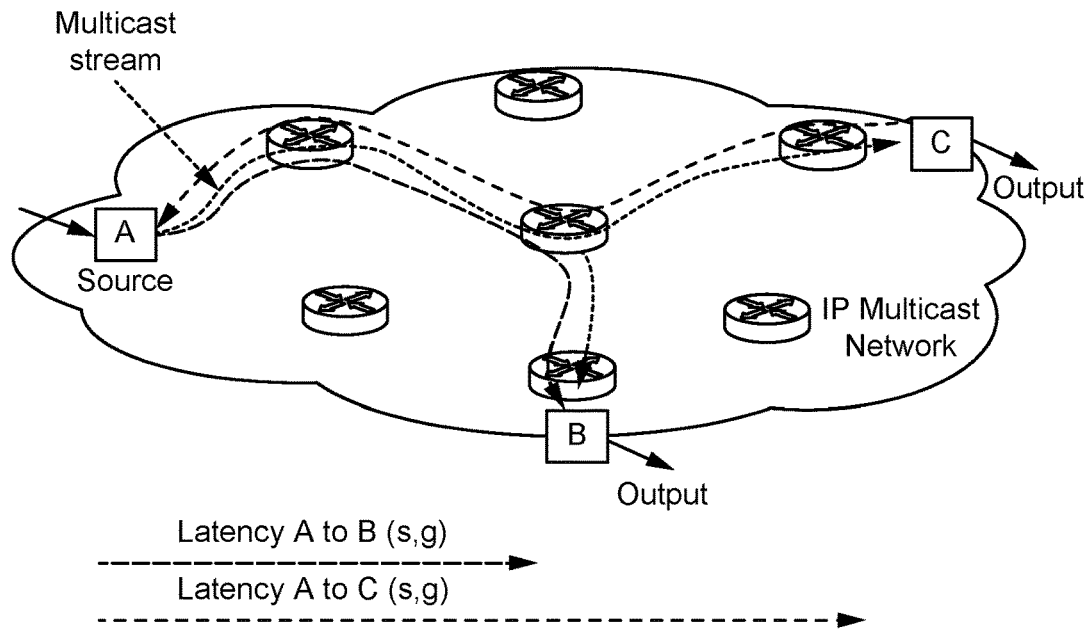
FIG. 4A shows network latency of the network from Source to Receivers.
Figure 4B:
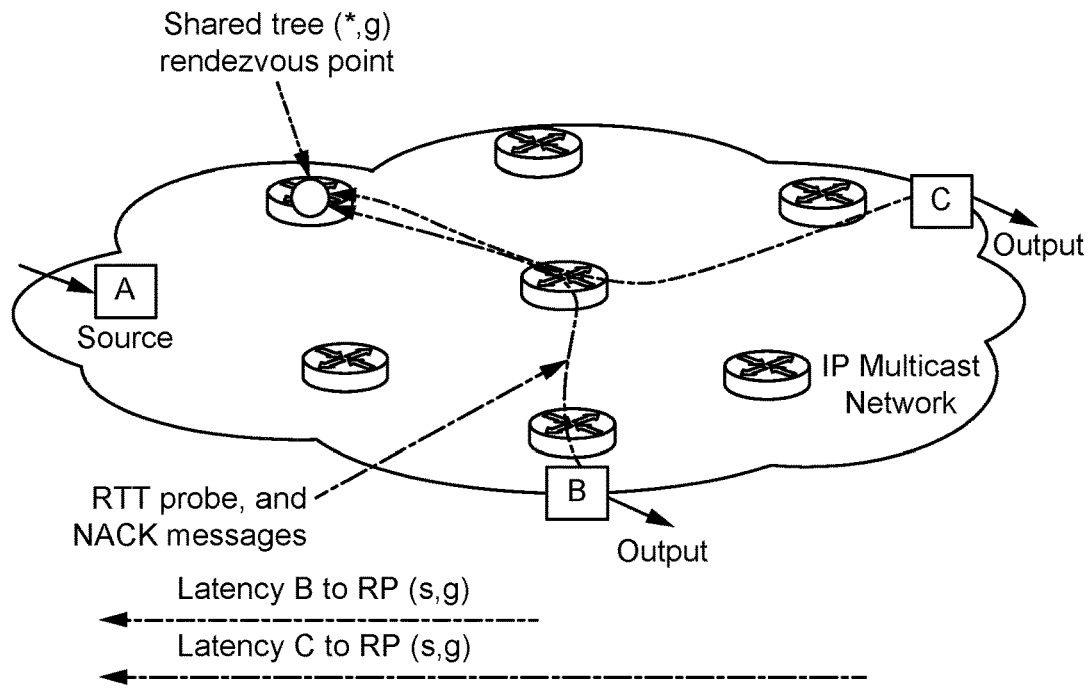
FIG. 4B shows network latency of the network from receivers to the shared multicast tree rendezvous point.
Figure 4C:
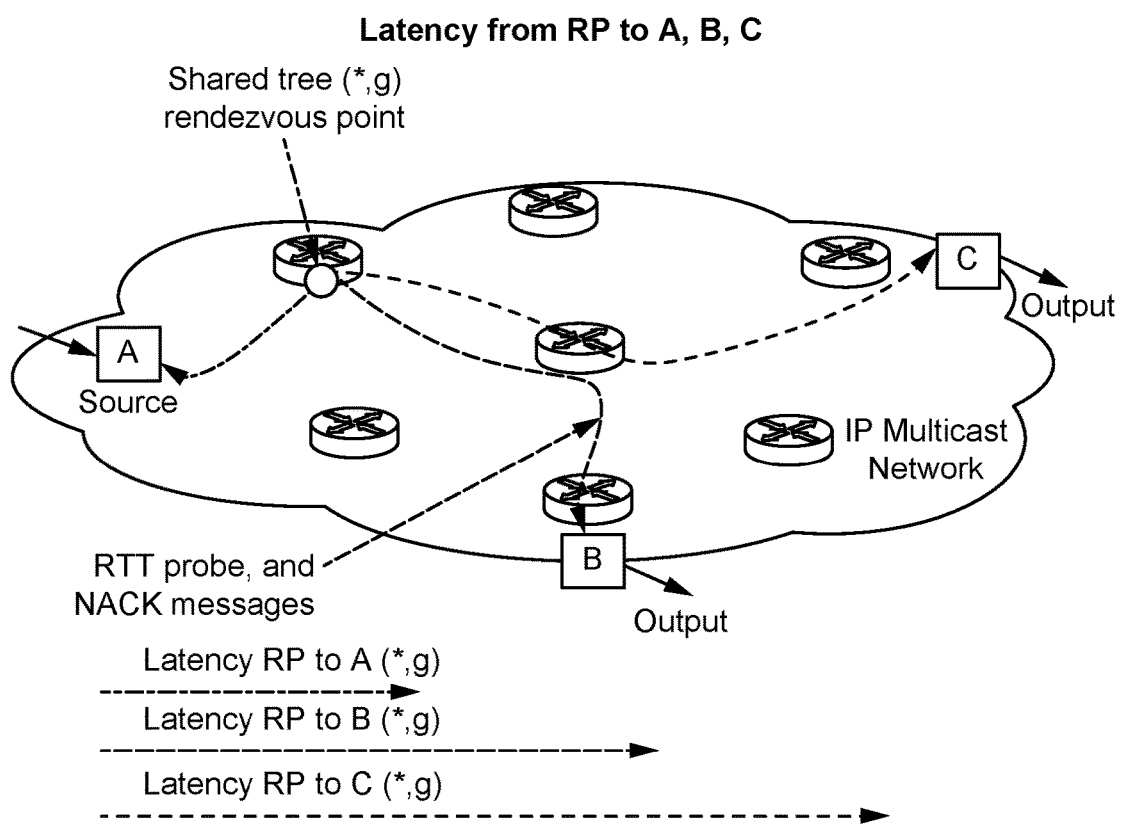
FIG. 4C illustrates network latency of the network from the rendezvous point to all nodes.

Referring to FIGS. 4A, 4B and 4C, the network latency of the network is made up of different component latencies: From source 104 to receivers 106 (S,G) in FIG. 4A, from receivers 106 to the shared multicast (*,G) tree rendezvous point (RP) FIG. 4B, and from the rendezvous point to all nodes (*,G) FIG. 4C. The latency difference in each direction is why the placement of the shared multicast (*,G) tree rendezvous point (RP) within the network is important, as it will affect the sources 104 and receivers ability to suppress duplicate NACKs, and duplicate transmission of data blocks.

Figure 5A:
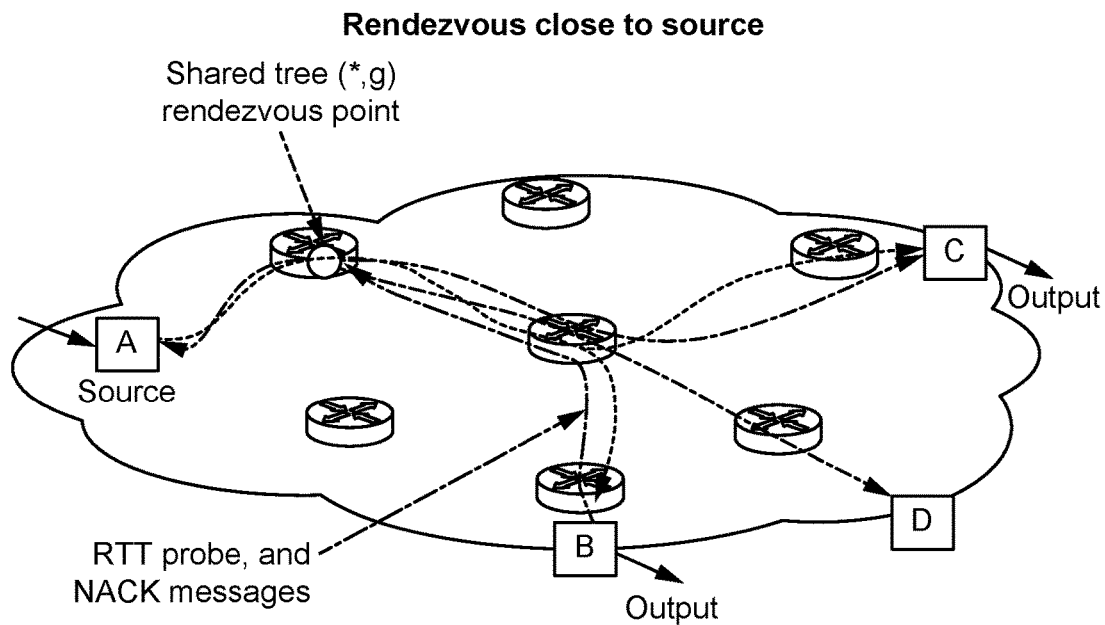
FIG. 5A illustrates different rendezvous point where source suppress duplicates, and FIG. 5B different rendezvous point where receivers suppress duplicates, according to an embodiment of the present invention.
Figure 5B:
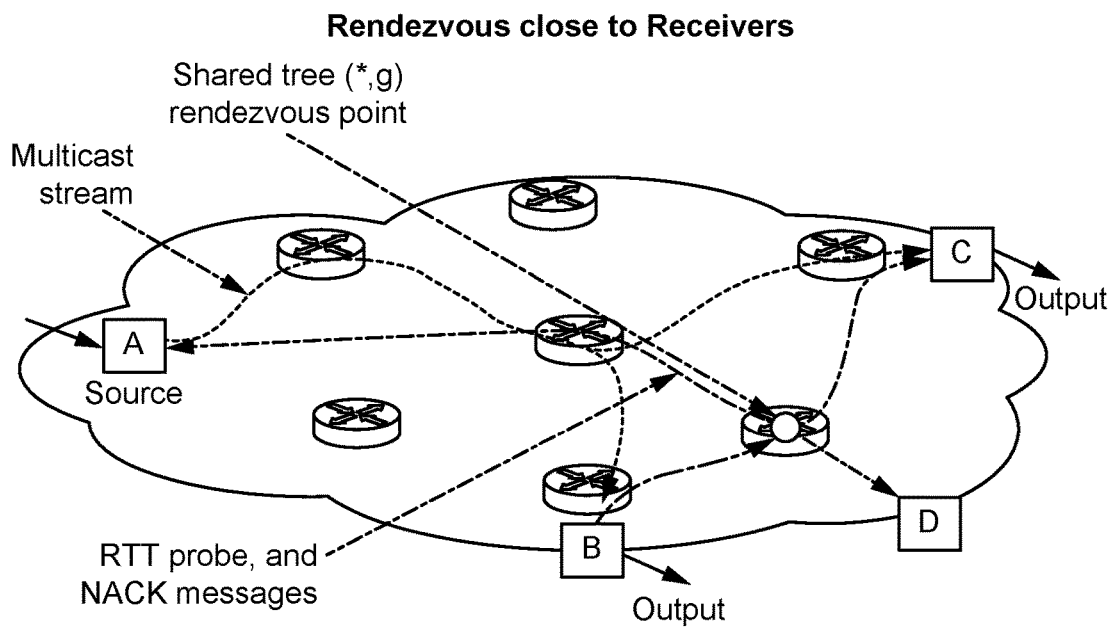

Referring to FIGS. 5A and 5B, depending on the relative position of the RP, suppression of duplicate NACKs can be done by the receivers 106, or the source 104: (1) RP close to the video source 104 means that multiple receivers 106 may NACK for the same lost packets, but the source 104 can suppress duplicates sending a single retransmission. This is because the receivers 106 will not see the NACK from other receivers 106 for a relatively long time; (2) if however the RP is close to the receivers 106, then when the first receivers 106 sends the NACK, the other receivers 106' will quickly see the NACK, and can suppress themselves, knowing the retransmission will arrive soon. The source 104 also suppress NACKs if sources 104 do send more than one NACK.

Further, before considering the modified multicast version used for the purposes of latency timing in the present invention, a brief overview of the standard NTP process is explained herein. The NTP protocol is designed for transferring high accuracy clock information from a master to a slave. Over repeated exchanges the slave is able to accurately measure latency and jitter, and therefore set its own clock. The NTP process measures latency and jitter, but does this for the purposes of setting the clock. However, in the present invention, the latency and jitter is important for the multicast purpose only, and does not set the clock although it could be used for this purpose. The NTP process essentially uses four high precision 64 bit timestamp (TS) variables, three of which are transmitted over the network, for the purpose for communicating accurate clock data. The inventive aspects and modified BVN is further described below.

Figure 6:
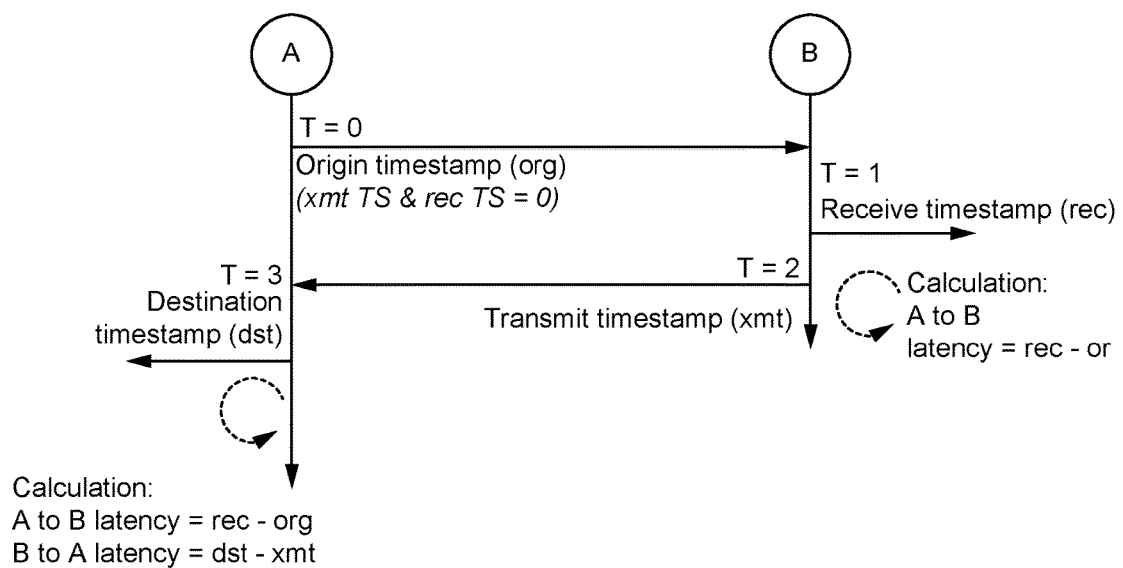
FIG. 6 shows NTP overview where the process of slave node A receiving the time from the master node B.

Referring now to FIG. 6, the process of slave node A receiving the time from the master node B, is shown.

Time T=0:
Node A populates the variable org, with rec and xmt set to zero (0). (64 bits+64 bits=128 bits set to zero (0)). Please note these 128 bits are those that will be repurposed/ "HiJacked" in the multicast proposal described later.

Time T=1:
Node B receives the packet, immediately records rec, and then performs other processing. It is possible at this point for Node B to calculate A to B latency=rec−org, although for NTPv4 there is no requirement/need to.

Time T=2:
Node B populates both rec and xmt, and immediately transmits the reply.

Time T=3:
Node A receives the packet, immediately records dst, and then can perform latency and jitter calculations. NTPv4 is interested in clock timing:

$$\text{Time offset}=[(\text{rec}-\text{org})+(\text{xmt}-\text{dst})]/2 \quad (1)$$

$$\text{Round trip delay}=(\text{dst}-\text{org})-(\text{xmt}-\text{rec}) \quad (2)$$

For the purpose of this discussion, latency in each direction is calculated as:

$$A \text{ to } B \text{ latency}=\text{rec}-\text{org} \quad (1)$$

$$B \text{ to } A \text{ latency}=\text{dst}-\text{xmt} \quad (2)$$

Figure 7A:
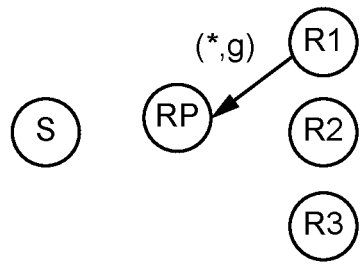
FIG. 7A shows receiver initiated probe.
Figure 7B:
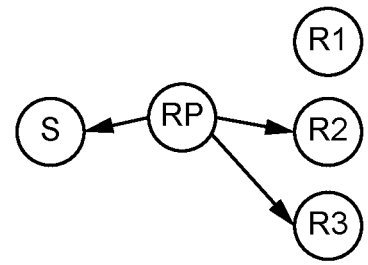
FIG. 7B illustrates rendezvous point.
Figure 7C:
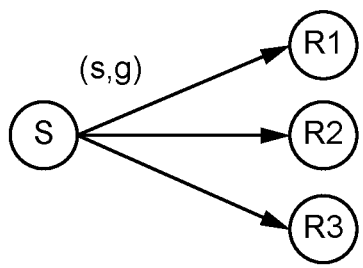
FIG. 7C shows sender response to the latency probe.

In latency probe process, the latency probes are initiated by the video receivers 106, rather than the video source 104, which avoids the video receivers 106 from needing to respond to the probes. Referring to FIGS. 7A, 7B and 7C, the latency probing work as follows, where the method is described from the perspective of the video source 104 and receivers 106, instead of relative to the latency probe packets. In FIG. 7A, on initial startup, to avoid the possibility of the receivers 106 all becoming synchronized, the latency probing will pause for a random number of seconds, between zero (0) and n and polling after the latency probe process starts. Then every Poll period number of seconds, or microseconds, each receiver 106, shown in the diagram as receiver #1 (R1), will send the latency probe messages to the shared (*,G) group.

Packet fields:
Reference ID (refid): Contains the video receiver's IP address.
Reference Timestamp: Latency probe sequence number.
Origin Timestamp (org): contains the 64 bit timestamp from the video receiver 106 on packet transmission.
Remaining timestamps are zero (0).

In FIG. 7B, the other receivers 106' receive the probes, which they do not respond too. The probe will reach the rendezvous point (RP), and then is delivered to both the video source 104 and the other receivers 106'. The shared (*,G) probe arrives at both the source 104 and the other receivers 106'. On reception: (1) The video source 104 can calculate the (*,G) latency from R1 to S, which it fills into the packet field "Receive Timestamp (rec)", (2) The other receivers 106' are also able to record the receive time, and therefore calculate the latency from R1 to themselves. This allows the receivers to know their relative position in relation to the other receivers 106' in the receiver 106 to source 104 direction.

In FIG. 7C, only the source S will respond using the source specific group (S,G), where the probe response will be received by all the receivers.

As it relates to FIG. 7, the present invention latency probing over multicast assumes clocks on all nodes are accurately set by another process, possibly normal unicast NTPv4 running on the same node, or by some kind of external clock, e.g. GPS, PTP. Network layer uses the same multicast group addresses as the S,G for downstream video delivery, and *,G in the reverse direction from the video receivers to the video source. The reason for using the same groups is that the timing data needs to be same for the same path as the video, where possible, on the same set of routers. NTPv4 can use a link local multicast address 224.0.1.1 with TTL 1, but this is completely unrelated to the routed multicast traffic used by this invention. NTP Application layer can be embedded in different to suit the specifics of the implementation: RTP payload with a unique RTP payload type. This method is most preferable, because the packets look most similar to the real video and will be treated by the work in a very similar way, but also supports alternative UDP on user defined port, where it would be recommended to use the standard NTP port 123, which facilitate use of diagnostic tools like Wireshark and also an ICMP based method.

The application behaviour is modified to repurpose/"Hi-Jack" the rec and xmt packet payload variables in the initial packet of the process. The variables are populated with data from a previous cycle, to allow the video source to learn the downstream latency, without necessary probing in the reverse direction. The rec and xmt will be for the current cycle number minus one (1), and for this reason will be out of date by the length of the polling period. It is expected that operator would increase the polling frequency if they expect the multicast paths to change regularly. Optionally, for very aggressive latency probing, the application behaviour is modified such that receivers of the probes wait a random period between zero and a configurable X % of NTP poll time variable. This is an important feature to avoid a synchronized multicast storm in response to the probes.

Figure 8A:
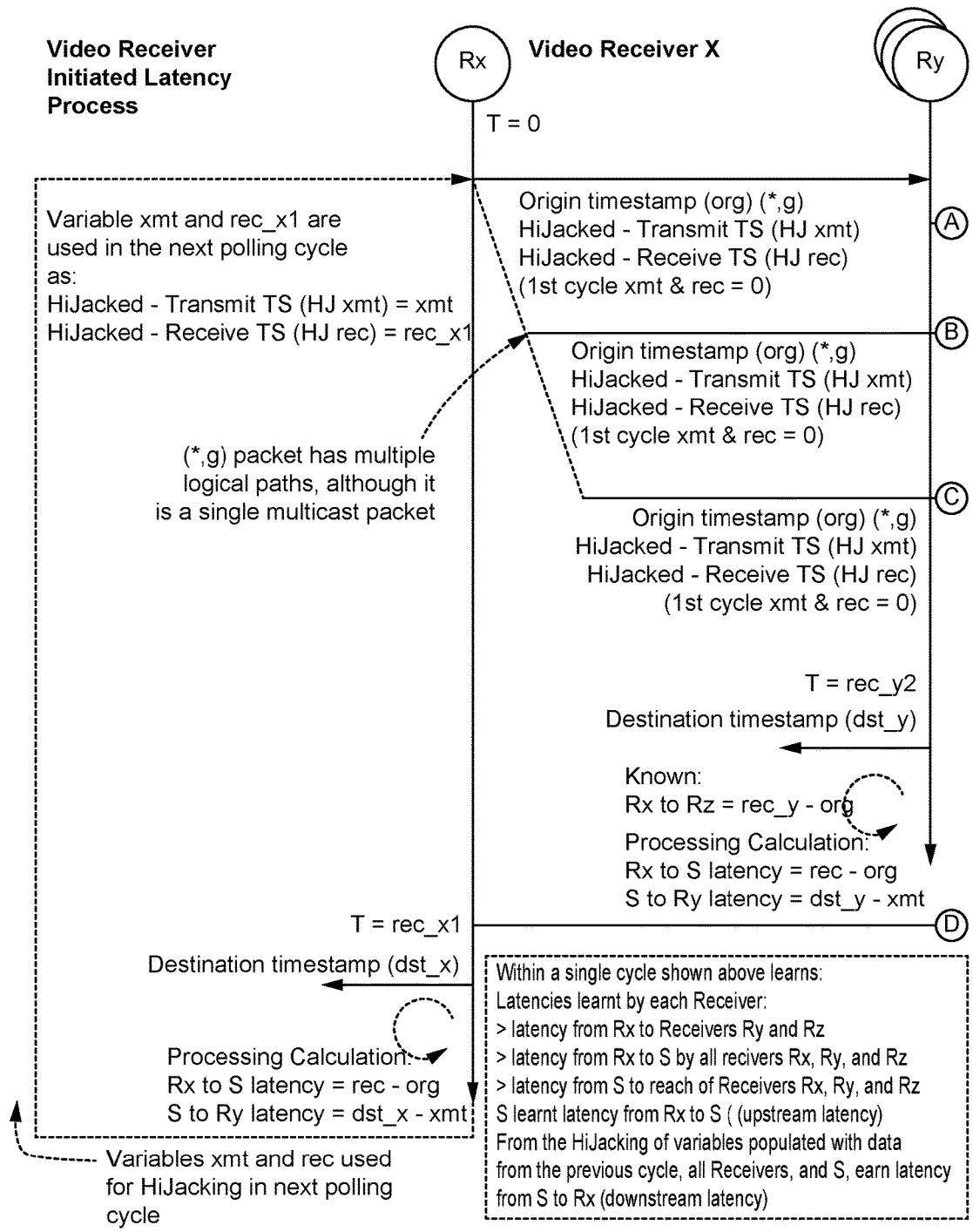
FIG. 8A-FIG. 8C illustrates overview of the latency probe process, according to an embodiment of the present invention.
Figure 8B:
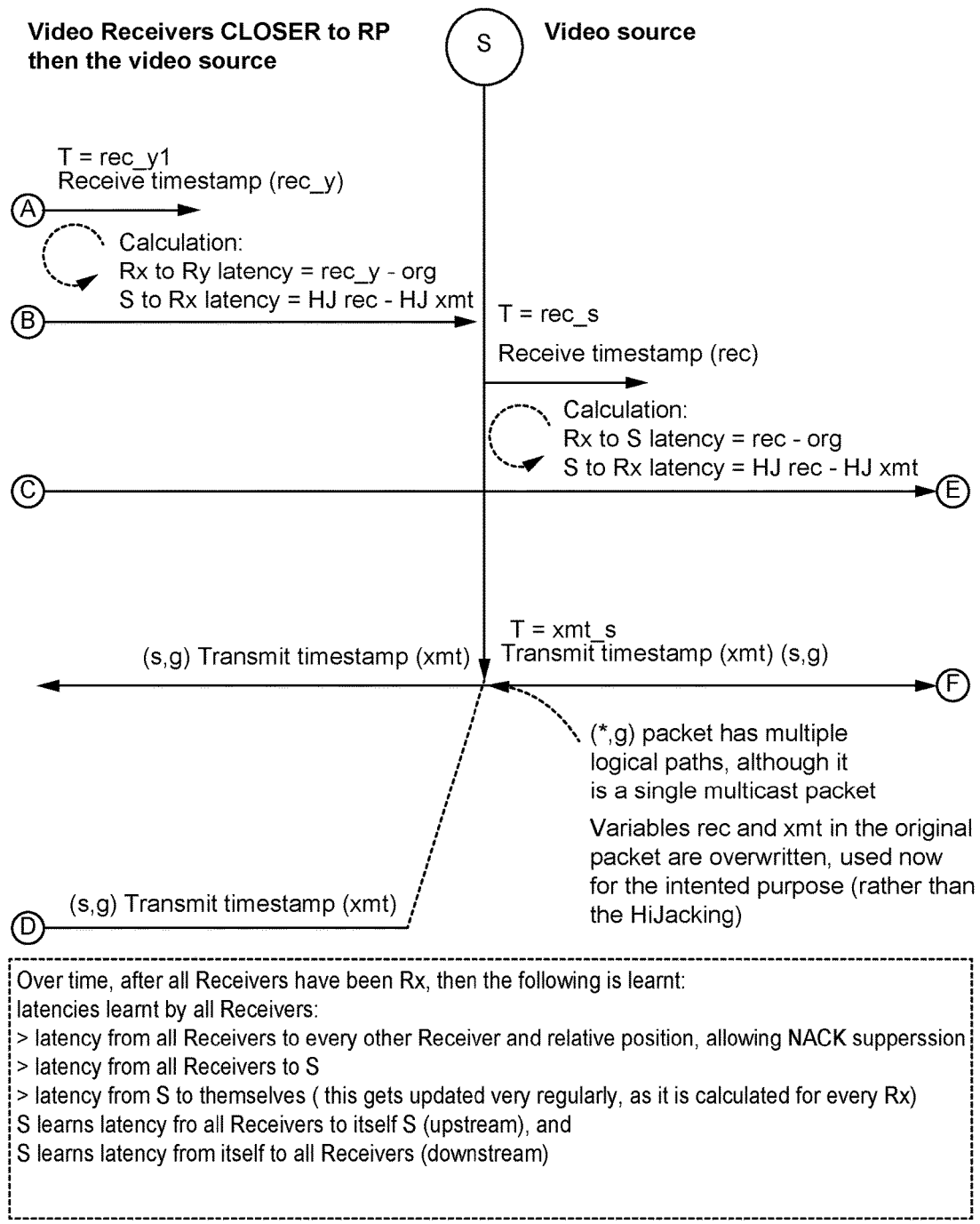
Figure 8C:
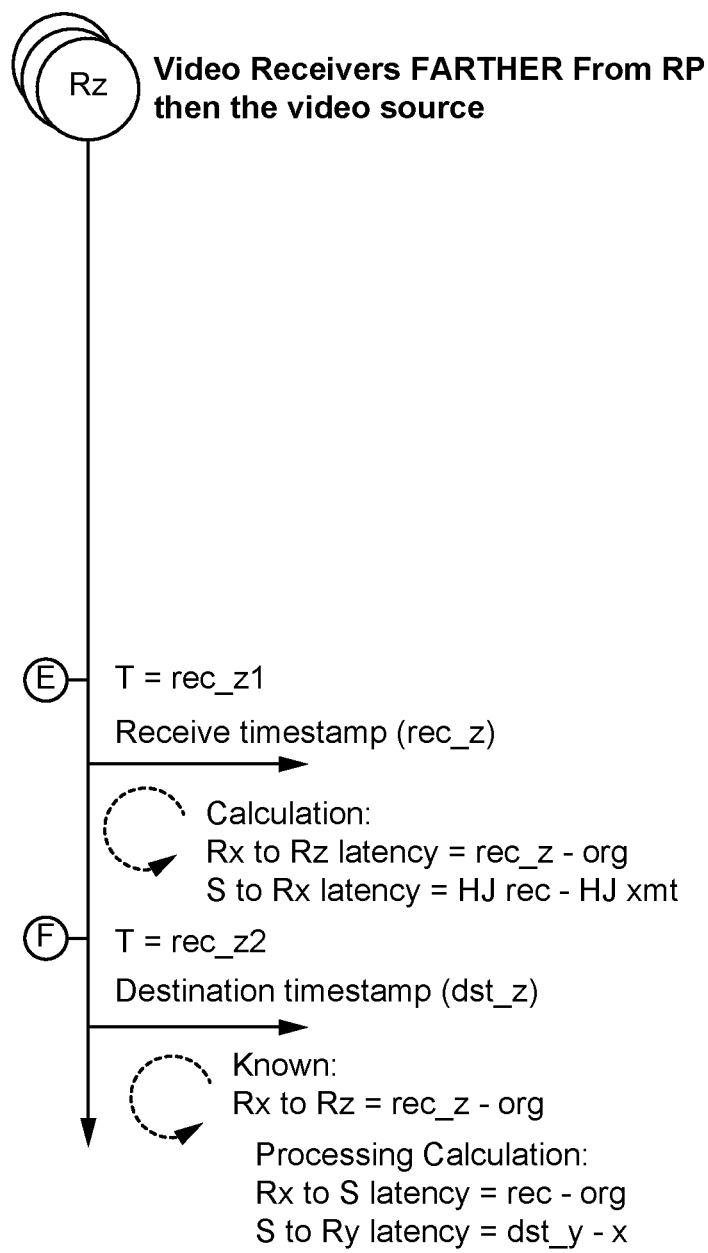
Figure 9A:
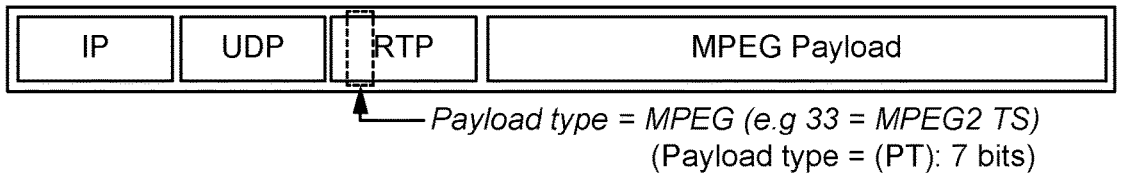
FIG. 9A-9D illustrates overview of the latency probe messages and different between the types of probes, according to an embodiment of the present invention.
Figure 9B:
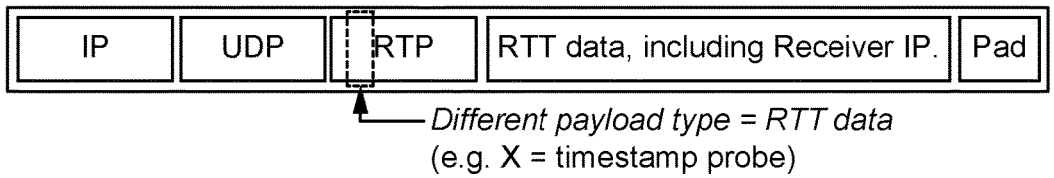
Figure 9C:
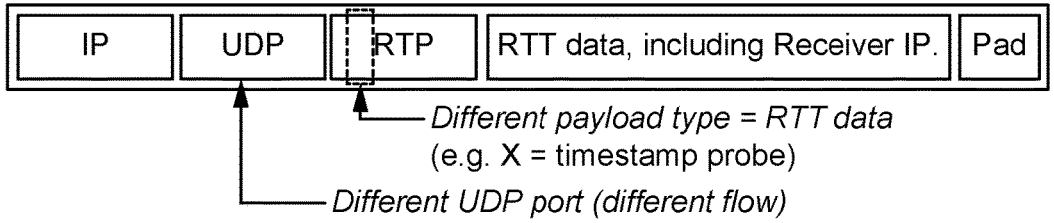
Figure 9D:
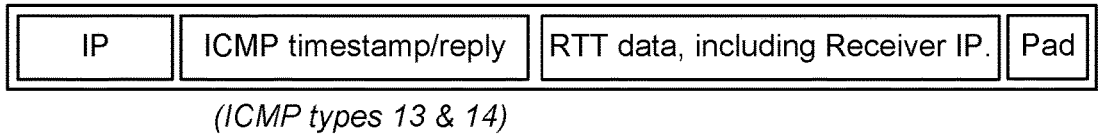

Referring to FIG. 8A-FIG. 8C, the video receiver and sender initiated flows next to each other, is shown.

Time T=0:

Node Rx populates the variable org, and repurposes/HiJacks the variables rec and xmt with the data received in step T=rec_x1 from a previous cycle. NTPv4 packet fields are populated:

"Reference ID (refid)" field is populated with the Rx's own IPv4 address, to be later used to identify the response from node S.

"Reference Timestamp" field will be populated with a sequence number representing the latency probe cycle. The value will be initialized to zero (0) when the node Rx starts, and will increment by one (1) every cycle, allowing counter roll naturally. The sequence number will help detect out of order latency responses, packet loss, and ultimately ensure network path changes (reconvergence) to a shorter path can be detected. The Node Rx records the values of all the variables sent in each cycle indexed by this sequence number, allowing it to make the correlations when receiving responses.

(HJ) xmt value is the value set by the video source at T=xmt_s, (HJ) rec is the value set by the node Rx when it receives the packet at T=rec_x1. These two values are the downstream latency from S to Rx, which the video source can now learn because of these HiJacked variables that would otherwise be "wasted". Obviously, for the first (1st) cycle this isn't possible, so rec and xmt are set to all zero (0)s just like NTPv4. The network layer addressing is sourced from IP of Rx, and destined towards the shared multicast tree *,G.

Time $T=rec\_y1$

Other video receivers, Ry, that are closer to the rendezvous point (RP) than the video source receive the packet from Rx. The receiving node Ry immediately records rec_y1, and it then able to calculate:

$Rx$ to $Ry$ latency=rec_$y$1-org $S$ to $Rx$ latency=(HJ)rec-(HJ)xmt

Over many cycles, Ry learns its relative position compared to all Rx and S, such that it knows if it is closer or farther from the RP, enabling NACK suppression.

Time $T=rec\_s$

The video source node, S, receives the multicast latency probe packet, records rec_s, and then performs processing:

Upstream latency from $Rx$ to $S$=rec_$s$-org

Downstream latency from S to Rx, from the previous cycle=(HJ) rec-(HJ) xmt

Over many cycles node S learns the upstream latency from all receivers, and the downstream latency from itself to all receivers. Historical data can be recorded allow the data to be smoothed, and/or detect path changes. After processing the received packet, node S, responds immediately, but to (hopefully) make the description of this sequence flow more intelligible this is described below at Time T=xmt_s.

Time $T=rec\_z1$

Other video receivers, Rz, those farther from the rendezvous point (RP) than the video source, receive the packet from Rx. The receiving node Rz immediately records rec_z1, and it then able to calculate:

$Rx$ to $Rz$ latency=rec_$z$1-org $S$ to $Rx$ latency=(HJ)rec-(HJ)xmt

Over many cycles, Rz learns its relative position compared to all Rx and S, such that it knows if it is closer or farther from the RP, enabling NACK suppression.

Time $T=xmt\_s$

Node S, after processing the received packet, the packet fields are populated as follows:
org remains unaltered as transmitted by Rx
Now the rec field is used for its normal NTPv4 purpose, rec=rec_s
xmt is similarly used as per NTPv4, xmt is the outgoing timestamp
Reference Id and Timestamp values remain unaltered as transmitted by Rx
The network layer addressing is the source specific S,G, remembering of course that the "Reference Id" field contains the IP of Rx, so the originator of this flow is not lost.

Time $T=rec\_y2$

The Ry receiver nodes, those closer to the source than Rx, receive the packet and record dst_z. These nodes can now calculate:

$Rx$ to $S$ latency=rec-org $S$ to $Ry$ latency=dst_$z$-xmt

Here, the S to Ry/Rz latency can be calculated frequently for every Rx probe. Implementers should keep this in mind when setting the polling frequency.

Time $T=rec\_x1$

Node Rx receives the response from its probe, which it detects based on the "Reference Id" matching it's own IP, and it able to correlate the probe by the "Reference Timestamp" value. On reception, it immediately records dst_x, and is then able to perform latency calculations:

Upstream Rx to S latency=rec−org

Downstream S to Rx latency=dst_x−xmt_s

Importantly for the next latency probing cycle, values xmt_s and dst_x, are recorded allowing node S (and all other nodes) to learn the downstream latency themselves.

Time T=rec_z2

The Rz receiver nodes, those rather from the source than Rx, receive the packet and record dst_z. These nodes can now calculate:

Rx to S latency=rec−org

S to Ry latency=dst_z−xmt

The S to Ry/Rz latency can be calculated frequently for every Rx probe. Implementers should keep this in mind when setting the polling frequency.

With reference to Packets, while trying to remain faithful to the NTPv4 RFC where possible, the changes to allow multicast latency probing are done in Network Layer, and Transport Layer. In network layer, the modification are shown in the below Table:

| Layer 3 IPv4 Field | Value and comment |
| --- | --- |
| Source IP | Interface address of the video receiver or sender node. This same IP address is populated into the "Reference ID (refid)" as described in the following section. |
| Destination IP | Unlike NTPv4 which uses the IANA reserved address 224.0.1.1, the destination will be the same multicast group address for the video stream the receiver node is protecting. The upstream video receiver to video source being (*, G), while the downstream being (S, G). |
| TTL | Unlike NTPv4 which has a maximum TTL of eight, the TTL will be configurable, and recommended to default to 64, with a maximum of 255. |
| DSCP | Configurable, but ideally the same as the video stream being protected. |

In transport layer, the NTPv4 exclusively uses UDP on port 123, however this invention allows for multiple types for timing probe methods, where a network operator should choose the most suitable method for implementation within their network. The reason multiple types are supported is because ideally the RTT probe messages will be treated by the network identically to the video packets. Often network routers match traffic flows based on a five tuple match on the IP packet, and then route all traffic of this type down exactly the same paths. If the probe messages use different five tuple, then they may use a different path, which will have a different latency characteristic:

Five Tuple IP Hash fields are Source IP, Destination IP, Source Port, Destination Port, and Protocol (UDP/TCP). Therefore, if possible, the very same five tuple can be used for both the video and latency messages, although each uniquely identified by a different RTP payload type. This invention implementation may support a configurable payload type for this purpose, and proposes to use RTP payload type=35 for the latency probes. However, as optional and backup options, the invention also allows for latency probes on a different UDP port, and as a last resort ICMP timestamp messages are supported. Referring to FIGS. 9A, 9B, 9C and 9D, difference between the probe types in accordance to latency probe messages are illustrated.

In application layer, the timestamps are all a 64-bit, unsigned fixed-point number in seconds and fraction with the decimal point to the left of bit 32. Referring to FIG. 10, in RTT Message Padding, the network may also treat different size packets differently, so any implementation of the invention allows padding at the end of the NTP payload messages. Padding is simply defined a padding size in bytes, which is filled with all zeros (0), all ones (1), or random data.

Figure 11:
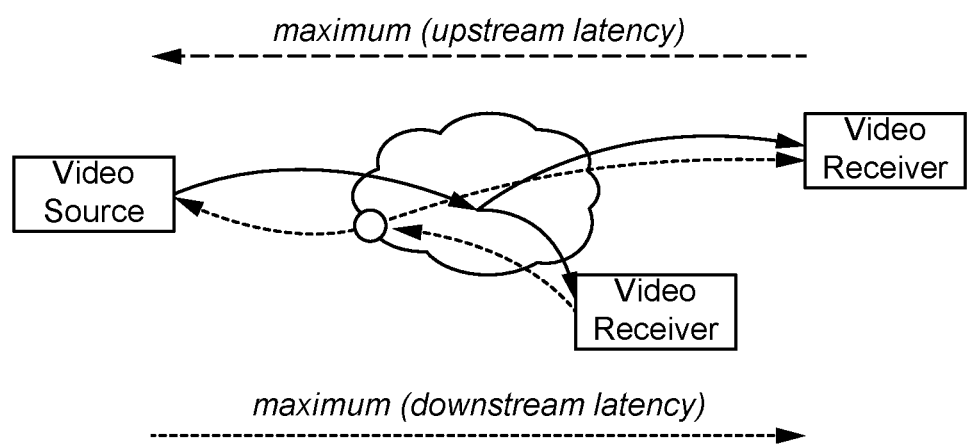
FIG. 11 illustrates overview of the buffer size, according to an embodiment of the present invention.

Referring to FIG. 11, the latency probes serve the very important function of allowing the correct buffer sizes to be set. The buffers obviously need to be large enough to avoid running out of buffer while the NACK and then retransmission arrives. This is the sum of Maximum upstream latency, Maximum downstream latency and a configurable percentage of additional buffer.

Users/Operators can decide to manually override the automatic buffer tuning, where it would be recommended to only over have a value larger than the automatically detected recommendation. However, the downside of large buffers is ultimately a longer delay between real-time and video playback.

Figure 12:
FIG. 12 illustrates an example of shorter/longer network paths, according to an embodiment of the present invention.

The network is likely to have redundant paths that are dissimilar in length, such that the primary path is shorter than the secondary path. Therefore, when implementing the system, the latency probes should be set into "learning mode", and the network operations team should simulate failure modes (or otherwise reconfigure the routing) into the worst-case mode. The probes will then automatically detect the worst-case latency, which is the latency that is likely to occur after a network failure and reconvergence event. Regular schedule maintenance should be performed to occasionally reconfirm the buffer sizes are appropriately set. For example, the following diagram attempts to illustrate a WAN in South America that has different latencies, shown in FIG. 12.

The present invention allows for the system to operate in a simplistic model, where NACKs are triggered only when the sequence number of the arrived packet is out of order. This method will mean that only missing packets are ever NACKed for, however means a larger buffer is required, and is less likely to recover from lost packets.

In an effort to minimize the buffer sizes, the present invention also supports a more advanced methods, which aim to predict packet loss as early as possible, increasing the likelihood of successful delivery before the buffer is exhausted. These methods may send unnecessary NACKs, which will result in unnecessary retransmissions, which is why these features are optional and configurable.

Figure 13A:
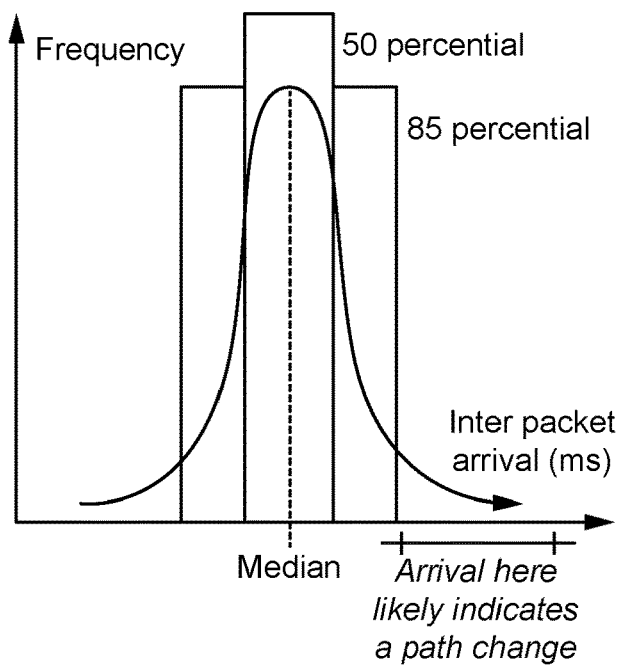
FIG. 13A and FIG. 13B illustrates low jitter network and high jitter network, according to an embodiment of the present invention.
Figure 13B:
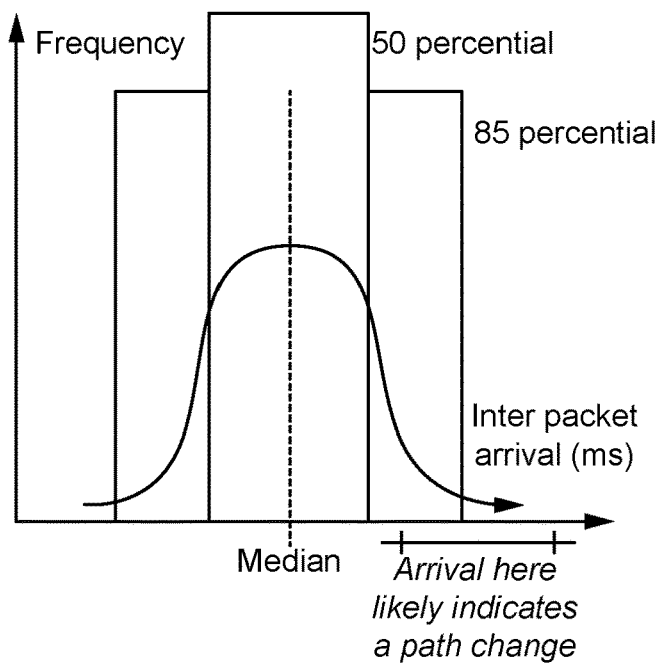

The system essentially can track inter-packet latency, and if the inter-packet arrival time exceeds a configurable threshold send the NACKs. To do this, each receiver will track the historical inter packet arrival times, allowing a statistical model of the arrival times to be built. Knowing the median and standard deviation of the inter packet arrival time, allows a threshold to be set for when the system should send a NACK. For example, if the system is configured to NACK when no packet has arrived for longer than the median+$X^{th}$ percentile ms, this will control the number of gratuitous NACKs. Referring to FIGS. 13A and 13B, the system is also self-tuning with regards to network jitter, where for example, the 85th percentile, on a low or high jitter network, will mean the number of NACKs sent is minimized.

Figure 14:
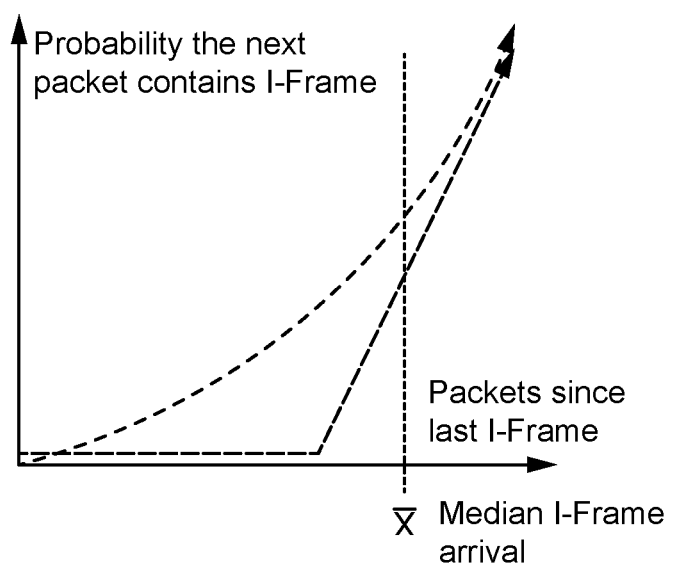
FIG. 14 shows a graph on probability of the next packet containing an I-Frame increases with the number of packets received since an IFrame, according to an embodiment of the present invention.
Figure 15:
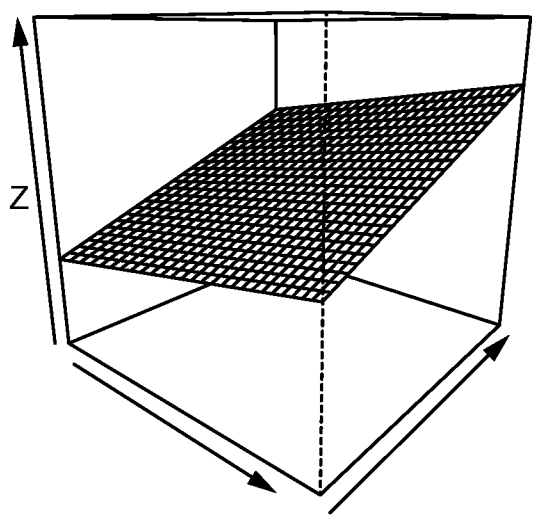
FIG. 15 shows a three-dimensional graph on system sending NACKs based on $X^{th}$ percentile of inter packet latency and Probability of I-Frame arriving next.

Referring to FIGS. 14 and 15, if the feature is enabled, the system will decode the MPEG packets within the RTP packet, and analyze the frequency of I-frame arrivals. Then for each steam, it can predict when an I-frame is more likely to arrive. For example, if the median I-frame arrival frequency is every tenth packet, then if an I-frame arrived nine packets ago, then it is very likely the next frame is going to be an I-Frame. This allows the system, according to the present invention to more aggressively send NACKs, as the likelihood of an I-frame being lost increases. The I-Frame frequency analysis is done on a per stream and ongoing basis, which allows the system to adjust the I-frame frequency overtime, as the video streams change in nature. The system supports multiple functions for adjusting the probability based on the packets since the last I-frame, which includes: basic mode to just track any packet frequency, and NACK when no packet has arrived for too long, and advanced mode taking into account the likelihood of different MPEG frame types. The system allow the NACK percentile to be configured on a per MPEG frame type basis.

The system can also track the aggressiveness of the NACK behaviour and record the success or failure, such that it can learn if it is being too aggressive or not. If the system is being too aggressive with NACKs, it will detect that it is sending NACKs, but actually does receive the packet for which it sent a NACK too early, and should therefore reduce the aggressiveness. Similarly, if it does not NACK aggressively enough, it might find that regularly it does not NACK, and then is required to NACK very close to running out of available playback buffer. The system includes tuning options to control the amount of historical data and smoothing capabilities, such that this learning does not adjust itself frequently.

To avoid NACK storms, the system allows configuration of a NACK rate-limit, such that the receivers will not NACK more than a certain number of times within a specified period. Multiple levels of rate-limit are possible, including: (1) Rate-limit of NACKs for a specific S, G address, (2) Rate-limit for a group of S, G addresses, and Overall system rate-limit.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

Although specific features of various embodiments of the invention may be shown in some drawings and not in others, this is for convenience only. In accordance with the principles of the invention, the feature(s) of one drawing may be combined with any or all of the features in any of the other drawings. The words "including", "comprising", "having", and "with" as used herein are to be interpreted broadly and comprehensively and are not limited to any physical interconnection. Moreover, any embodiments disclosed herein are not to be interpreted as the only possible embodiments. Rather, modifications and other embodiments are intended to be included within the scope of the appended claims.

I claim:

1. A system to improve reliability for IP Multicast Broadcast Video Networks (BVN) between a plurality of nodes, the BVN having real transport protocol (RTP) packets, the system comprising:
   at least one data stream receiver configured to receive a data stream which comprises data, the at least one data stream receiver integral with the BVN;
   at least one shared multicast distribution tree rendezvous point group address on the BVN, the at least one shared multicast distribution tree rendezvous point group address being configured to communicate with the plurality of nodes;
   wherein the data stream receiver is one of the plurality of nodes and comprises a processor and a memory for storing instructions that when executed by the processor causes the data stream receiver to:
   introduce a video payload buffer to the BVN with the data indexed by a RTP packet sequence number;
   send a negative acknowledgement (NACK) request for a missing packet of the RTP packets, wherein:
   the NACK request is a (*,.G) request sent to the shared multicast distribution tree rendezvous point group address for which a plurality of the at least one data stream receivers receive the NACK allowing for suppression of NACKs for the RTP packets;
   in response the NACK request (*,.G) being sent, the data stream receiver inserts a latency of a size of the buffer based on expected path loss period for allowing suppression of duplicate NACK requests by other data stream receivers on the BVN:
   the NACK comprises a plurality of packet sequence numbers in which each packet of the RTP packets comprise singleton packet sequence numbers, a range of singleton packet sequence numbers or both;
   the range comprises low and high sequence numbers, wherein the NACK request is a shared multicast *,.G group address request for retransmission for which a plurality of the at least one data stream receivers receive the NACK allowing for suppression of NACKs for the RTP packets; and
   the data stream receiver insert additional latency of a size of the buffer based on expected path loss period, for allowing suppression of duplicate NACK requests by other data stream receivers.

2. The system of claim 1, further comprising at least one data stream sender integral with the BVN, wherein the data stream sender comprises a processor and a memory for storing instructions that when executed by the processor causes the data stream sender to suppress sending more than one duplicate for a single network event.

3. A method for improving reliability for IP Multicast Broadcast Video Networks (BVN) between a plurality of nodes, the BVN having real transport protocol (RTP) packets, the method comprising the steps of:
   inserting additional latency of a size of the buffer based on an expected path loss period, wherein:
   downstream nodes receive a video, analyze the RTP sequence number, and request retransmission when there are out of linear sequence RTP packets, automatic buffer size learning, or tuning, based on the network latency detection,
   requesting retransmission from receiver to a source for missing data referenced by either the RTP sequence number, or by byte-offset, wherein:
   the retransmission request is sent to a shared multicast distribution tree, for which all the receivers of the video stream being protected can see a negative acknowledgement (NACK) requests;
   the NACK request is a (*,.G) request sent to the shared multicast distribution tree rendezvous point group address for which a plurality of the at least one data stream receivers receive the NACK allowing for suppression of NACKs for the RTP packets:
   wherein in response to the NACK request (*,.G) being sent, the data stream receiver inserts a latency of a size of the buffer based on expected path loss period for allowing suppression of duplicate NACK requests by other data stream receivers on the BVN:

tracking inter packet arrival times and allowing the receivers to suppress requests of packets that have already been requested by another receiver, and also allowing the source to suppress sending more than one duplicate, for a single network event, and detecting Network round-trip time based on shared multicast probes, using either time information embedded within RTP payload, or via an alternative UDP packet with time information or via ICMP timestamp messages for controlling retransmission, where unicast TCP leverages the two way positively acknowledged communication to gather latency timing information.

4. The method of claim 3, further comprising any one or more combinations of sending the negative acknowledgement (NACK) request for a missing packet of the RTP packets, wherein:

the NACK comprises a plurality of packet sequence numbers in which each packet of the RTP packets comprise singleton packet sequence numbers, a range of singleton packet sequence numbers or both, the range comprises low and high sequence numbers, wherein the NACK request to the shared multicast distribution tree request for retransmission for which a plurality of the at least one data stream receivers receive the NACK allowing for suppression of NACKs for the RTP packets, and the data stream receiver insert additional latency of the size of the buffer based on expected path loss period, for allowing suppression of duplicate NACK requests by other data stream receivers.

5. The method of claim 3, further comprising at least one data stream sender integral with the BVN, wherein the data stream sender comprises a processor and a memory for storing instructions that when executed by the processor causes the data stream sender to detect a Network round-trip time based on one or more shared multicast probes, using either time information embedded within the RTP payload, or via an alternative user datagram protocol (UDP) packet with time information or via an internet control message protocol (ICMP) timestamp messages for controlling retransmission, where a unicast transmission control protocol (TCP) leverages a two way positively acknowledged communication to gather latency timing information.

6. The method of claim 3, further comprising at least one data stream sender integral with the BVN, wherein the data stream sender comprises a processor and a memory for storing instructions that when executed by the processor causes the data stream sender to suppress sending more than one duplicate for a single network event.

7. A system to improve reliability for IP Multicast Broadcast Video Networks (BVN) between a plurality of nodes, the BVN having real transport protocol (RTP) packets, the system comprising:

at least one data stream receiver configured to receive a data stream which comprises data, the at least one data stream receiver integral with the BVN, the data stream receiver being one of the plurality of nodes;

at least one shared multicast distribution tree rendezvous point group address on the BVN, the at least one shared multicast distribution tree rendezvous point group address being configured to communicate with the plurality of nodes;

wherein the data stream receiver comprises a processor and a memory for storing instructions that when executed by the processor causes the data stream receiver to:

introduce a video payload buffer to the BVN with the data indexed by a RTP packet sequence number and send a negative acknowledgement (NACK) request for a missing packet of the RTP packets;

wherein the NACK request is a (*,.G) request sent to the shared multicast distribution tree rendezvous point group address for which a plurality of the at least one data stream receivers receive the NACK allowing for suppression of NACKs for the RTP packets: and wherein in response to the NACK request (*,.G) being sent, the data stream receiver inserts a latency of a size of the buffer based on expected path loss period for allowing suppression of duplicate NACK requests by other data stream receivers on the BVN.

8. The system of claim 7, wherein the NACK comprises a plurality of packet sequence numbers in which each packet of the RTP packets comprise singleton packet sequence numbers, a range of singleton packet sequence numbers or both, wherein the range comprises low and high sequence numbers.

9. The system of claim 7, further comprising any one or more combinations of sending the negative acknowledgement (NACK) request for a missing packet of the RTP packets, wherein:

the NACK comprises a plurality of packet sequence numbers in which each packet of the RTP packets comprise singleton packet sequence numbers, a range of singleton packet sequence numbers or both, the range comprises low and high sequence numbers, wherein the NACK request is a to the shared multicast distribution tree request for retransmission for which a plurality of the at least one data stream receivers receive the NACK allowing for suppression of NACKs for the RTP packets, and the data stream receiver insert additional latency of a size of the buffer based on expected path loss period, for allowing suppression of duplicate NACK requests by other data stream receivers.

10. The system of claim 7, further comprising at least one data stream sender integral with the BVN, wherein the data stream sender comprises a processor and a memory for storing instructions that when executed by the processor causes the data stream sender to detect a Network round-trip time based on one or more shared multicast probes, using either time information embedded within an RTP payload, or via an alternative user datagram protocol (UDP) packet with time information or via an internet control message protocol (ICMP) timestamp messages for controlling retransmission, where a unicast transmission control protocol (TCP) leverages the two way positively acknowledged communication to gather latency timing information.

11. The system of claim 7, further comprising at least one data stream sender integral with the BVN, wherein the data stream sender comprises a processor and a memory for storing instructions that when executed by the processor causes the data stream sender to suppress sending more than one duplicate for a single network event.

12. The system of claim 7, wherein the received is configured to:

track the historical inter packet arrival times, allowing a statistical model of the inter packet arrival times to be built calculate the median and standard deviation of the inter packet arrival time;

set a threshold for when the system should send the NACK;

if an inter-packet arrival time exceeds a configurable threshold, send the NACKs.

13. The system of claim 7, wherein the system is self-tuning with regard to network jitter.

* * * * *